(No Model.)

H. W. BRACKEN.
SAFETY AIR CLUTCH FOR ELEVATORS.

No. 349,299. Patented Sept. 21, 1886.

Witnesses:
J. B. Pouleur
J. Johnson

Inventor:
H. W. Bracken

UNITED STATES PATENT OFFICE.

HENRY W. BRACKEN, OF SAN FRANCISCO, CALIFORNIA.

SAFETY AIR-CLUTCH FOR ELEVATORS.

SPECIFICATION forming part of Letters Patent No. 349,299, dated September 21, 1886.

Application filed October 26, 1885. Serial No. 181,015. (No model.)

*To all whom it may concern:*

Be it known that I, HENRY W. BRACKEN, a citizen of the United States, residing in the city and county of San Francisco and State of California, have invented a new and useful Safety-Clutch for Elevators, of which the following is a specification.

My invention relates to safety-clutches actuated by the pressure of the air upon air wings or arms, which receive the pressure of the air in the shaft, thereby operating the clutch. It will be readily understood by reference to the accompanying drawings and the letters referring thereto.

Figure 1:
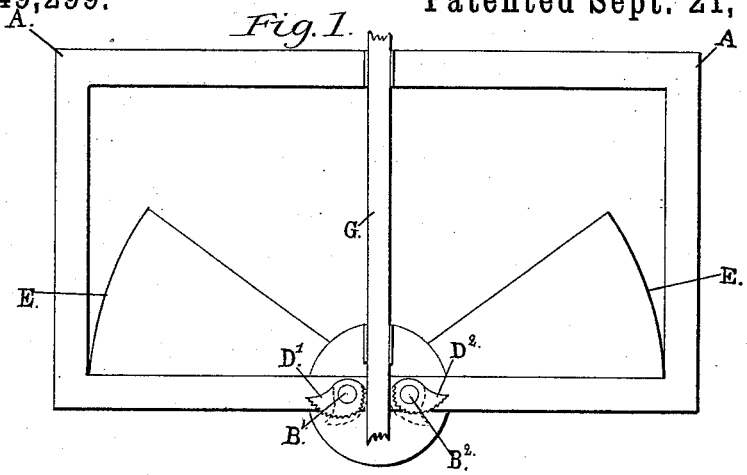
Figure 2:
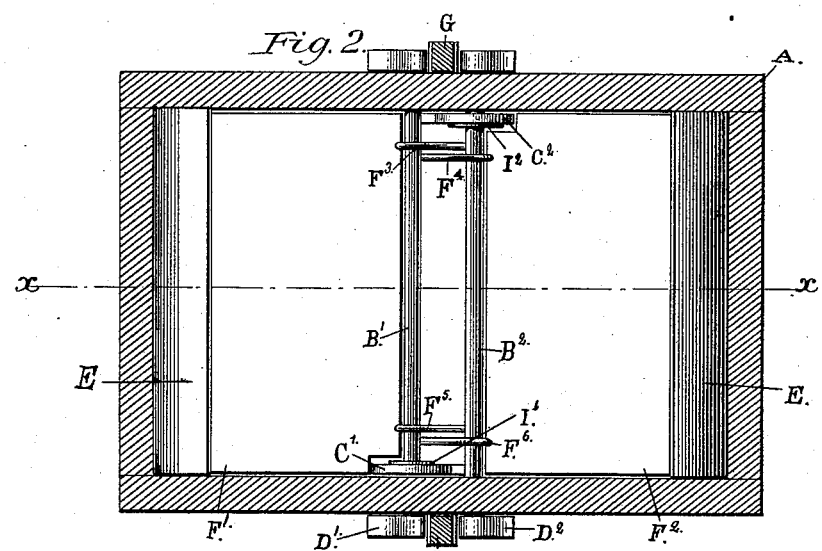
Figure 3:
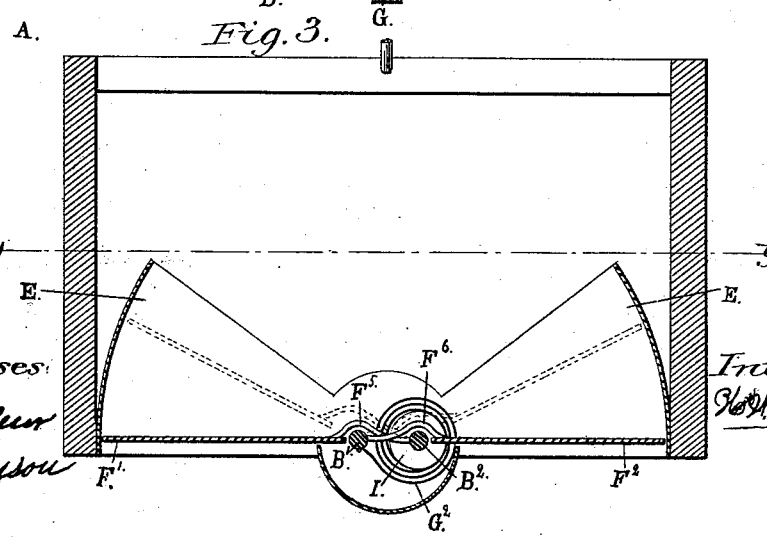

Figure 1 is a side elevation; Fig. 2, a sectional plan view cut through the broken line Y Y; and Fig. 3, a sectional elevation showing the machine cut vertically through the center at the broken line X and X, with the dogs removed.

A represents the frame.

B' represents the left axle or pivot shaft to which the wing F' is attached.

B² represents the right axle or pivot shaft to which the wing F² is attached.

C' represents the spring which operates upon the pivot-shaft B' and coupling-block I'.

C² represents the spring which operates upon the pivot-shaft B² and coupling-block I².

D' represents the left dog.

D² represents the right dog.

E and E represent the air-housings, to confine the air to the wings F' and F².

F' and F² represent the wings or air arms, and G represents the guide.

The following is the construction of the same: I form the frame A of iron or other suitable material. I form the wings of very light sheet metal inserted in the axles B and the housing E, of sheet metal, sufficiently strong to hold the pressure of the air. I form the axles and couplings or spring-connecting blocks of iron by any well-known mode of construction.

The machinery described is all placed under the bottom of the elevator or cage, so that the pressure of the air by the rapid descent of the cage in the shaft is met directly by the wings F' and F². The following is the operation of the same: As the cage is dropped by an increased velocity, the wings F' and F² are operated by the air under the same and caused to rise, revolving the dogs D' and D², and causing them to clutch the guide G, as shown in Fig. 1 by the dotted lines.

I do not confine myself to any exact form of construction as it may be varied without changing the principle of the invention; but

What I claim, and desire to secure by Letters Patent, is—

The wings F' and F², attached to the pivot-shafts B' and B², and having the encircling springs C' and C², attached by means of the coupling-blocks I' and I², and having the dogs D' and D², to clutch with the guide G, for the purpose of stopping an elevator-cage, constructed and operated substantially as and for the purposes set forth.

H. W. BRACKEN.

Witnesses:
J. B. POULEUR,
JOSEPH JOHNSON.